Patented Aug. 18, 1925.

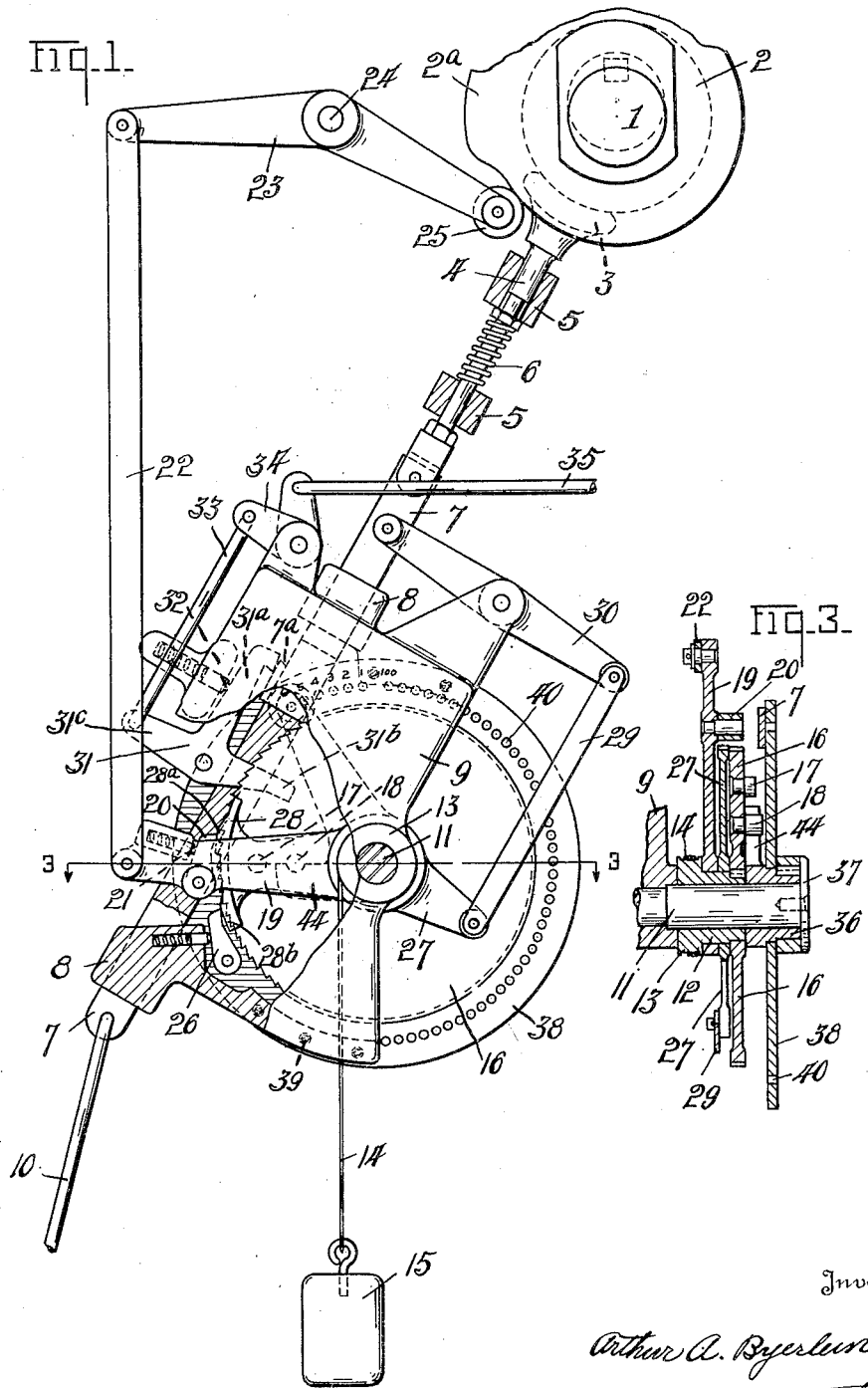

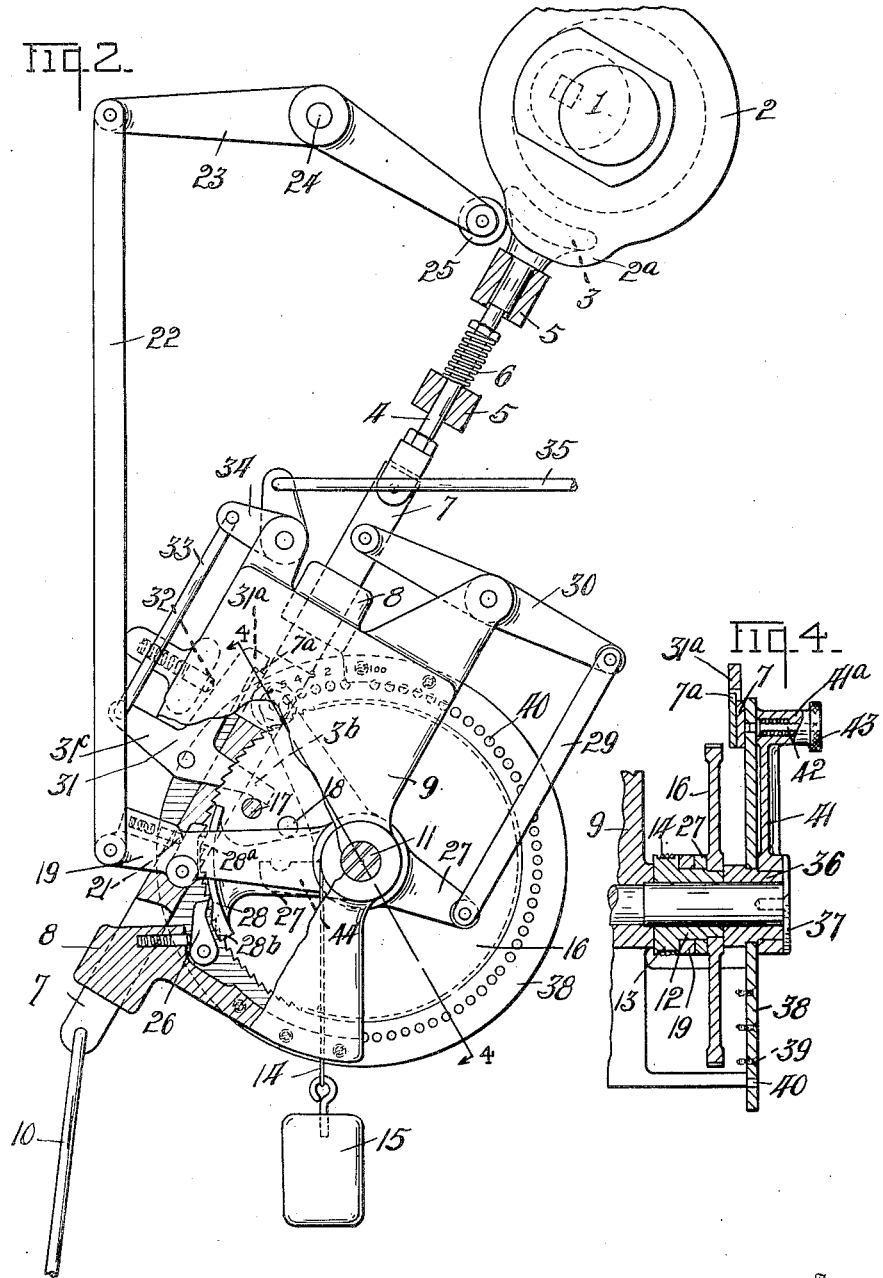

1,549,963

UNITED STATES PATENT OFFICE.

ARTHUR A. BYERLEIN, OF TOLEDO, OHIO, ASSIGNOR TO THE TOLEDO MACHINE & TOOL COMPANY, OF TOLEDO, OHIO, A CORPORATION OF OHIO.

AUTOMATIC STOP CONTROL FOR PRESSES.

Application filed November 1, 1923. Serial No. 672,038.

*To all whom it may concern:*

Be it known that I, ARTHUR A. BYERLEIN, a citizen of the United States, and a resident of Toledo, in the county of Lucas and State of Ohio, have invented a certain new and useful Automatic Stop Control for Presses, which invention is fully set forth in the following specification.

This invention relates to automatic control means for the stop or control clutches of drawing, punch or other presses or machines where the operation of the machine is stopped after the clutch shaft has made one or a predetermined number of revolutions.

In some machines of the character described, it is desirable and important to employ a control mechanism which is adjustable or capable of being set to automatically stop the operation of the machine after the performance of a predetermined number of operations or cycles thereof or revolutions of the clutch shaft to suit the particular work in hand.

The object of the invention is the provision of a control mechanism of the class described which is simple and efficient in its construction and operation, and capable of being easily and quickly set to cause an automatic stopping of the machine or throwing out of the clutch after one or any predetermined number of revolutions of the clutch shaft or operations of the machine have been performed and then to automatically return to starting or initial position.

Further objects and advantages of the invention will be understood from the following detailed description thereof.

While the invention in its broader aspect is capable of embodiment in numerous forms, a preferred embodiment thereof is illustrated in the accompanying drawings, in which, Figure 1 is a side elevation of the mechanism embodying the invention in association with a clutch to be controlled thereby and with different parts broken away and in section, the control mechanism being in initial stop position with the associated clutch in released position. Fig. 2 is a similar view with the clutch in operating engagement and with the control means therefor substantially in position to effect a releasing movement of the clutch. Fig. 3 is a section on the line 3—3 in Fig. 1, and Fig. 4 is a section on the line 4—4 in Fig. 2.

Referring to the drawings, 1 designates the clutch shaft of a machine and may constitute the crank shaft as is very frequently the case, and 2 is the movable member of a clutch mounted on said shaft and adapted to be held in released or disengaged relation with respect to its companion clutch member by a clutch shoe 3 when seated or projecting a predetermined distance into a circumferential groove of the movable clutch member, as well understood in the art. Upon a retraction of the shoe 3 from the operative position shown in Fig. 1 to the inoperative position shown in Fig. 2, with respect to the clutch member 2, such member is permitted to move into clutch engagement with its companion which is the continually rotating driven member of the clutch, and to communicate rotation to the shaft 1. It will be understood that the clutch member 2 is the driven member of the clutch and is connected to the shaft to effect a driving thereof when in engagement with its drive companion member (not shown). Inasmuch as the construction and operation of clutches of this type are well understood in the art, it is not necessary to describe or show the same in detail.

The clutch shoe 3 has a stem 4 projecting therefrom and guided for radial movements relative to the clutch member 2 by guide parts 5 of the associated machine frame. A coiled compression spring 6 encircles the stem 4 intermediate the clutch parts 5 and acts on the stem to yieldingly urge it and its clutch shoe to the clutch releasing position shown in Fig. 1. The stem 4 is connected at its outer end to a trip bar 7, which is mounted in bearings 8 in a flat part 9 for longitudinal reciprocatory movements toward and away from the clutch shaft. The trip bar 7 is connected at its lower end by a rod 10 to a foot pedal, hand lever or other suitable manually operated control part, not shown.

A shaft 11 fixedly projects from a part of the frame member 9 at one side of the trip bar 7 and a sleeve 12 is mounted for free rotation on this shaft adjacent to the frame member 9. The sleeve 12 forms a drum 13 at its inner end around which a cable 14 winds, one end of such cable being connected to the drum and the other end extending downward from the drum being connected to a means which exerts a pull on the cable to cause a normal turning of the drum and sleeve in one direction. A weight 15 is shown, in the present instance, as constituting said means. The outer end of the sleeve 12 has a ratchet wheel 16 fixed thereto and this wheel is provided at its outer side with two face pins 17 and 18, arranged, in the present instance, in the same radial line of the ratchet wheel and with the pin 18 disposed closer to the wheel axis than the pin 17.

An arm 19 is mounted for free rocking movements on the sleeve 12 at the inner side of the ratchet 16 and carries near its outer end a pawl 20 which is normally urged into engagement with the ratchet teeth of the wheel 16 by a spring pressed detent 21 carried by the arm. The outer end of the arm 19 is connected by a link 22 to one end of a bell crank lever 23, which is fulcrumed to the machine frame at 24 adjacent to the clutch member 2, the inner end of this lever being provided with a roller 25 which rides on a peripheral portion of the clutch member 2. This portion of the clutch member has a cam projection 2ª thereon which engages the roller 25 at a predetermined point in each revolution of the clutch member and imparts a rocking movement to the lever 23 and to the connector arm 19. A spring pressed pawl 26 is carried by the frame part 9 and normally engages the teeth of the ratchet wheel 16 to prevent back turning of such wheel.

A pawl release lever 27 is loosely mounted on the sleeve 12 between the wheel 16 and arm 19 and has one end terminating in a segmental portion 28 provided on its outer circumferential surface with two raised portions 28ª and 28ᵇ adapted to engage respectively with the pawls 20 and 26 to hold such pawls out of engagement with the ratchet wheel teeth when the lever 27 is in the position shown in Fig. 1. The opposite end of the lever 27 is connected by a link 29 to one end of a lever 30, which is fulcrumed to the frame part 9 and connected to the trip bar 7, whereby a downward or clutch shoe retracting movement of the bar will effect a rocking of the lever 27 to move its projecting surfaces 28ª and 28ᵇ out of engaging register with the pawls 20 and 26, thereby permitting such pawls to have operating engagement with the ratchet wheel 16.

A three-arm catch lever 31 is fulcrumed to the frame-part 9 near one side of the trip bar 7 and has an arm 31ª forming a catch for engagement over a catch shoulder 7ª on the trip bar 7 for retaining the trip bar and connected parts in retracted position after being retracted to release the clutch member 2 and permits its operative engagement with the companion clutch member. An arm 31ᵇ of the catch lever projects inwardly at the outer side of the ratchet wheel 16 in position to be engaged and tripped by the pin 17 on the ratchet wheel when the ratchet wheel has been turned a predetermined extent by the pawl 20. The tripping of the catch lever 31 by the pin 17 causes the arm 31ª of the bar to disengage the catch shoulder 7ª on the trip bar 7, thus permitting the clutch shoe 3 to return to its normal operative position and effect a disengagement of the clutch member 2 from its companion. This movement of the trip bar also actuates the lever 27 to move its cam surfaces 28ª and 28ᵇ into engagement with the pawls 20 and 26 to retain them out of engagement with the ratchet wheel. A spring pressed detent 32 acts on the catch lever 31 to normally move it into catch engagement with the trip bar. In order to permit a manual release of the catch lever 31 from the trip bar 7, the outwardly projecting arm 31ᶜ of the catch lever is connected by a link 33 to a bell-crank lever 34 carried by the frame part 9, and this lever is in turn connected by a rod 35 to a suitable manual control means, not shown, or, if desired, it may extend to a point where it may be conveniently reached and pulled by the operator.

A sleeve 36 is mounted for free turning movements on the shaft 11 at the outer end of the sleeve 12. In the present instance a disk 37 is secured to the outer end of the shaft and retains the sleeve 36 in position thereon. An index disk 38 is mounted on the sleeve 36 intermediate its ends and is held against turning by the frame part 9, to a part of which it is fixedly secured by screws 39, or in any other suitable manner. This index disk has a circularly arranged series of apertures 40 provided in a side thereof near its outer edge, these apertures, in the present instance, being noted as running from one to one hundred. An index arm 41 is fixed on the outer end portion of the sleeve 36 and is provided at its outer end with a handle portion 41ª carrying a pin 42, which is spring pressed to normally engage within a registering aperture 40 of the index disk 38. The outer end of the pin 42 is provided with a knurled head 43 without the handle 41ª to permit a manual retraction of the pin from engagement with an aperture in the index member.

The sleeve 36 at the inner side of the index disk 38 is provided with an arm 44, which projects in the path of movement of the ratchet-wheel pin 18 and coacts therewith to serve as a stop for limiting the permissible back turning movements of the ratchet wheel, which movements are influenced by the pulling action of the weighted cable 14 on the drum 12 to which the ratchet wheel 16 is fixed.

The operation of the mechanism embodying the invention is as follows: Before tripping the clutch controlled shoe 3 to permit an engagement of the clutch member 2 with the continually driven member of the clutch, the operator determines the number of cycles or successive operations of the machine necessary to perform the work in hand. For instance, if it is desired to have the machine automatically stopped at the end of a single revolution of a predetermined driven member, in the present instance the shaft 1, the index arm 41 is turned to place its pin 42 in register with the aperture No. 1 of the index disk 38, the pin being permitted to lock into such aperture to retain the parts in such position. If, however, the performance of the work requires six revolutions of the rotatable member 1, the index arm 41 is moved for its pin to engage the aperture No. 6 of the member 38, as shown in the drawing. The work being in place in the machine, the operator trips the bar 7 to disengage the clutch control shoe 3 from, or place it in inoperative relation with respect to, the clutch member 2, which then moves into engagement with its companion and effects a driving of the shaft 1, the trip or control means being held in such inoperative position by the engagement of the catch arm 31ª of the catch lever 31 over the shoulder 7ª of the trip rod 7. Such tripping movement of the bar 7 also actuates the lever 27 through the lever 30 and link 29 to move the cam projections 28ª and 28ᵇ of the lever 27 out of engagement with the pawls 20 and 26, to permit the pawls to engage the teeth of the ratchet wheel 16. The pawl 26 acts on the ratchet wheel to prevent a back turning thereof and the pawl 20, which is carried by the arm 19, is actuated once in the present instance, during each complete revolution of the shaft 1 to impart a predetermined indexing movement to the ratchet wheel. When the machine has completed the six operations or cycles for which it has been set, the pin 17 on the ratchet wheel 16 will have moved into engagement with the arm 31ᵇ of the catch lever 31 and moved it to effect a release of the catch arm 31ª from holding engagement with the trip bar 7, thus permitting the clutch control shoe 3 to return to operative relation to the clutch member 2 and effect a disengagement of the same from its companion. Upon a movement of the trip bar 7 to operative position with respect to the clutch, the lever 27 is returned to position for its cam projections 28ª and 28ᵇ to engage the respective pawls 20 and 26 and release them from engagement with the ratchet wheel. When the pawls 20 and 26 have been moved to release the ratchet wheel, the latter is turned back under the action of the pull on the cable 14, in the present instance by the weight 15, and the ratchet wheel continues its backward movement until it has reached its initial starting position, where it is stopped by the coaction of the pin 18 thereon with the arm 44 of the indexing means, which arm is fixed to and adjustable with the index arm 41. The operation of the machine may be stopped at any time during a running thereof by a manual push on the rod 35, which effects a release of the catch lever from holding engagement with the trip bar 7.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent, is,

1. In combination with a driven member, a slidable member for controlling the driven member, latching means to hold said slidable member against sliding, a stationary index disk, a tensioned rotatable ratchet wheel, a rocking arm having a pawl engageable with the ratchet teeth, a pawl to prevent retrograde movement of the ratchet wheel, means operable by the driven member to rock said arm, a release lever to control the operative and inoperative position of each of said pawls, means to actuate said lever connected to the slidable member, an index arm having means for selective engagement with the index disk, and separate means on the ratchet wheel for releasing the latching means and for engaging the index arm to arrest the retrograde movement of the ratchet wheel.

2. In combination with a driven member, manually operable means for controlling the driven member, latching means to hold the manual means in operative position, tensioned rotatable means, having means to release the latching means, means to progressively actuate the rotatable means, means to prevent retrogressive movement of the rotatable means, a common control for each of the two last named means, means operated upon movement of the manual means for moving the common control and thereby said two means thereof into and out of operative relation to the rotatable means, means operated by the driven member to operate the means for progressively actuating the rotatable means, and adjustable means to determine the extent of retrogressive movement of the rotatable means when the latter is free to respond to its tension.

3. In combination with a driven member, manually operable means for controlling the driven member, latching means to hold the manual means in operative position, tensioned rotatable means having means to release the latching means, means to progressively actuate the rotatable means, means to prevent retrogressive movement of the rotatable means, a common control for each of the two last named means, means operated upon movement of the manual means for moving the common control and thereby said two means thereof into and out of operative relation to the rotatable means, means operated by the driven member to operate the means for progressively actuating the rotatable means, and adjustable means to determine the extent of retrogressive movement of the rotatable means when the latter is free to respond to its tension including a projection on the rotatable means, an arm movable to be set to engage the projection, and means to releasably hold the arm in its predetermined position.

4. In combination with a driven member, manual means to control the driven member, means to latch the manual means in operative position, a rotary ratchet, means to effect retrogressive movement of the ratchet, a pawl for progressively rotating the ratchet, means to actuate the pawl, means actuated by the manual control to move the pawl into and out of operative relation to the ratchet, projections on the ratchet one of which is engagable with the latching means to release same, and means movable to be set in various predetermined positions and being engageable with the other projection of the ratchet to arrest the retrogressive movement thereof.

5. In combination with a driven member, manual means to control the driven member, means to latch the manual means in operative position, means to release the latching means, means to effect progressive movement of the latch releasing means, and means to determine the extent of movement of the latch releasing means so as to set same at a distance from the latch in accordance with the number of revolutions which the driven member is to have before release of the latching means.

6. In combination with a driven member, means to control the driven member, means to latch the control means in operative position, rotary means, means associated with the rotary means to release the latching means, means to progressively move the rotary means, means to effect retrogressive movement of the rotary means and means capable of being set in a selected position to arrest retrogressive movement of the rotary means in accordance with the predetermined number of revolutions which the driven member is to have.

7. In combination with a driven member, means to control the driven member, rotary means, means operated by and upon each revolution of said members to actuate the rotary means in one direction, means to move the rotary means in an opposite direction, means capable of being set in a selected position to arrest movement of the rotary means in said opposite direction in accordance with the predetermined number of revolutions which the driven member is to have and means operable by the rotary means for rendering the control means inoperative.

8. In combination with a driven member, means to control the driven member, rotary means, means operated by and upon each revolution of said members to actuate the rotary means in one direction, means to move the rotary means in an opposite direction, means on the rotary means for rendering the control means inoperative, and adjustable means to arrest the movement of the rotary means in said opposite direction thereof so as to set the said means on the rotary means to require the latter to be moved in the first direction to actuate the control means to an extent governed by the number of revolutions which the driven member is to have.

9. In combination with a driven member, manually operable means for controlling the driven member, latching means to hold the manual means in operative position, rotatable means having means to release the latching means, means to progressively actuate the rotatable means, means to prevent retrogressive movement of the rotatable means, a common control for each of the two last named means, means operated upon movement of the manual means for moving the common control and thereby said two means thereof into and out of operative relation to the rotatable means, means operated by the driven member to operate the means for progressively actuating the rotatable means, means to retrogressively move the rotatable means when released from the means for preventing retrogressive movement thereof, adjustable means and means on the rotatable means to engage the adjustable means thereby to control the extent of retrogressive movement of the rotating means.

10. In combination with a driven member, manually operable means for controlling the driven member, latching means to hold the manual means in operative position, rotatable means having means for releasing the latching means, means to rotate the rotatable means in a direction to effect release of the latching means, means to effect rotation of the rotatable means in an opposite direction, and index means capable of being set in various positions to arrest said opposite movement of the rotatable means thereby to provide a varying starting point for the rotatable means spaced relative to the latching means in accordance with the selected number of revolutions with the driven member is to have.

In testimony whereof, I have hereunto signed my name to this specification.

ARTHUR A. BYERLEIN.